United States Patent
Goetz et al.

(10) Patent No.: US 11,088,633 B2
(45) Date of Patent: Aug. 10, 2021

(54) DISTORTION SPECTRUM CONTROL BY SPACE VECTOR MODULATION

(71) Applicant: Dr. Ing. h.c. F. Porsche Aktiengesellschaft, Stuttgart (DE)

(72) Inventors: Stefan Goetz, Forstern (DE); Christian Korte, Karlsruhe (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/764,840

(22) PCT Filed: Jun. 27, 2018

(86) PCT No.: PCT/EP2018/025177
§ 371 (c)(1),
(2) Date: May 15, 2020

(87) PCT Pub. No.: WO2019/096439
PCT Pub. Date: May 23, 2019

(65) Prior Publication Data
US 2020/0358370 A1    Nov. 12, 2020

(30) Foreign Application Priority Data
Nov. 15, 2017 (DE) ...................... 10 2017 126 840.5

(51) Int. Cl.
*H02M 7/5387* (2007.01)
*H02M 1/12* (2006.01)

(52) U.S. Cl.
CPC ......... *H02M 7/53871* (2013.01); *H02M 1/12* (2013.01); *H02M 7/53876* (2021.05)

(58) Field of Classification Search
CPC ......... H02M 7/53803; H02M 7/53871; H02M 7/53873; H02M 1/12; H02M 2007/53876; H02M 2007/53871
See application file for complete search history.

(56) References Cited

U.S. PATENT DOCUMENTS

| 6,088,246 A | 7/2000 | Okuyama et al. |
| 7,589,984 B2 * | 9/2009 | Salomaki ............. H02M 1/126 363/41 |

(Continued)

FOREIGN PATENT DOCUMENTS

| DE | 10 2011 088 242 | 6/2013 |
| DE | 10 2012 210 658 | 12/2013 |
| DE | 10 2016 106 472 | 10/2017 |

OTHER PUBLICATIONS

C. Tao, A.A. Fayed, "PWM control architecture with constant cycle frequency hopping and phase chopping for spur-free operation in buck regulators", in IEEE Transactions on very large scale integration (VLSI) systems, 21(9), 1596-1607 (2013).

(Continued)

*Primary Examiner* — Adolf D Berhane
(74) *Attorney, Agent, or Firm* — Gerald E. Hespos; Michael J. Porco; Matthew T. Hespos (57) ABSTRACT

The present invention relates to a method for controlling a distortion spectrum that arises for a switch-based inverter (306), which modulates at least one output variable, by virtue of space vector modulation, characterized in that different switch positions (312) causing a modulation of the at least one output variable which approximates to a predefined reference signal (310), are ascertained for each chronologically sequential switching process, a respective distortion spectrum for differences between the reference signal (310) and the at least one output variable that would arise from a respective realization of these different switch positions (312) is calculated, and the switch position (314) for which the associated distortion spectrum is most suitable according to predetermined properties is selected and implemented in the inverter (306). Further provided are a corresponding system and a corresponding modulator.

20 Claims, 8 Drawing Sheets

(56) References Cited

U.S. PATENT DOCUMENTS

| | | | |
|---|---|---|---|
| 8,564,997 B2 * | 10/2013 | Urushibata | H02M 5/297 363/159 |
| 9,537,427 B2 * | 1/2017 | Jiang | H02M 7/5395 |
| 10,873,272 B2 * | 12/2020 | Kitou | H02P 27/08 |
| 2008/0252250 A1 | 10/2008 | Hida et al. | |
| 2008/0297100 A1 | 12/2008 | Hiti et al. | |
| 2011/0012544 A1 | 1/2011 | Schulz et al. | |
| 2012/0075892 A1 | 3/2012 | Tallam et al. | |
| 2012/0139461 A1 | 6/2012 | Suzuki et al. | |
| 2015/0077025 A1 | 3/2015 | Suzuki | |
| 2017/0294901 A1 | 10/2017 | Goetz | |

OTHER PUBLICATIONS

W. Yao, H. Hu and Z. Lu, "Comparisons of Space-Vector Modulation and Carrier-Based Modulation of Multilevel Inverter", in IEEE Transactions on Power Electronics, 23(1), 45-51 (2008).

Jae Hyeong Seo, Chang Ho Choi and Dong Seok Hyun, "A new simplified space-vector PWM method for three-level inverters", in IEEE Transactions on Power Electronics, 16(4), 545-550 (2001).

B.P. McGrath, D.G. Holmes and T. Lipo, "Optimized space vector switching sequences for multilevel inverters", in IEEE Transactions on Power Electronics, 18(6), 1293-1301 (2003).

S.M. Goetz, A.V. Peterchev and T. Weyh, "Modular Multilevel Converter With Series and Parallel Module Connectivity: Topology and Control", in IEEE Transactions on Power Electronics, 30(1), 203-215 (2015).

Korte Christian et al.—"Space-vector frame spectral control of the switching distortion of an automotive drive inverter"—2-17 19th European Conference on Power Electronics and Applications, Jointly Owned IEEE-PELS and EPE Association, Sep. 11, 2017.

Cortes P. et al.—"Predictive Current Control Strategy With Imposed Load Current Spectrum"—IEEE Transactions on Power Electronics, Institute of Electrical and Electronics Engineers, USA, vol. 23, No. 2, Mar. 2008, pp. 612-618.

Kouro S. et al.—"Model Predictive Control—A Simple and Powerful Method to Control Power Conventers"—IEEE Transactions on Industrial Electronics, IEEE Service Center, Piscataway, NJ, USA, vol. 56, No. 6, Jun. 2009, pp. 1826-1838.

International Search Report dated Sep. 21, 2018.

* cited by examiner

DISTORTION SPECTRUM CONTROL BY SPACE VECTOR MODULATION

BACKGROUND

Field of the Invention

The invention relates to a method and a system for controlling switching distortions in an inverter by means of space vector modulation, in particular when the inverter is used in an electric vehicle.

Related Art

In electric vehicles, an inverter and a power electronics section generally consisting of multiple semiconductor switches is used to control an electric motor. An output variable, that is to say output voltage or output current, which is modulated for the most part sinusoidally by means of the switches and also provided by the inverter in multiple phases, e.g. for the operation of a three-phase drive motor, is produced primarily by means of pulse width modulation. A large number of switching changes is necessary to model a sinusoidal shape as accurately as possible. These lead to what are known as switching harmonics, i.e. fundamentals and harmonics thereof caused by switching frequencies, in a frequency spectrum, which are manifested as spectral peaks with associated high energy density.

An introductory overview and a method for influencing the frequency spectrum are provided by C. Tao, A. A. Fayed, "PWM control architecture with constant cycle frequency hopping and phase chopping for spur-free operation in buck regulators", in IEEE Transactions on very large scale integration (VLSI) systems, 21(9), 1596-1607 (2013).

DE 10 2016 106 472 A1 from the applicant discloses a method by which the advantages of an otherwise high switch frequency and the disadvantages of this approach are related to one another. Switching distortions and switching losses are thus rated against one another and intent is made to minimize them. However, the disclosed method is a binary control system that can only be used for controlling a single-phase output variable. The possibilities of space vector modulation for controlling the multilevel systems cannot be used in this case.

The documents that follow all relate to the control of switching distortions in the inverter by means of space vector modulation, in particular for the application in electric vehicles.

In DE 10 2011 088 242 A1, voltage vectors are set in suitable fashion by means of space vector modulation in order to compensate for a dead time in the inverter without a measurement of phase currents and/or phase voltages.

DE 10 2012 210 658 A1 describes a method that avoids an excess temperature at least for one of the switches acted upon by space vector modulation within an inverter when a current is provided.

US 2008/0252250 addresses the handling of the dead time in the inverter and discloses a method that keeps an output voltage during the dead time to a defined value.

US 2008/0297100 A1 relates to the reduction of inverter voltage losses if a large torque is produced in the electric motor at low (rotation) frequency, this being the case in particular during a starting process for the electric motor.

The reduction of switching losses in the inverter when determining a rotor angle position in the electric motor is disclosed in US 2011/0012544 A1, this involving the waveform of the pulse width modulation being modified.

Voltage losses are also intended to be reduced by the method described in US 2012/0075892 A1, which method involves the switching states in the inverter being controlled.

In US 2012/0139461 A1 and US 2015/0077025 A1, the switches of an inverter are controlled by a control unit such that dead time and switching distortions are reduced.

U.S. Pat. No. 6,088,246 proposes widening the spectra over a predetermined frequency range in a high-frequency component of each of the output voltages of the inverter. The electromagnetic noise produced by the inverter, which noise can sometimes also interfere with the control of the electric motor, is thus intended to have its energy density attenuated.

The prior art likewise describes space vector modulation methods for multilevel converters, e.g. in W. Yao, H. Hu and Z. Lu, "Comparisons of Space-Vector Modulation and Carrier-Based Modulation of Multilevel Inverter", in IEEE Transactions on Power Electronics, 23(1), 45-51 (2008), Jae Hyeong Seo, Chang Ho Choi and Dong Seok Hyun, "A new simplified space-vector PWM method for three-level inverters", in IEEE Transactions on Power Electronics, 16(4), 545-550 (2001), or else in B. P. McGrath, D. G. Holmes and T. Lipo, "Optimized space vector switching sequences for multilevel inverters", in IEEE Transactions on Power Electronics, 18(6), 1293-1301 (2003).

A central multilevel converter in this context is the modular multilevel converter MMSPC, described by S. M. Goetz, A. V. Peterchev and T. Weyh, "Modular Multilevel Converter With Series and Parallel Module Connectivity: Topology and Control", in IEEE Transactions on Power Electronics, 30(1), 203-215 (2015).

However, not one of these methods is capable of controlling or regulating the distortion spectrum. Instead, all of these methods produce marked switching harmonics in the distortion spectrum.

Against this background, it is an object of the invention to provide a method that discloses a modulation method for the output variables of an inverter, which modulation method uses the advantages of space vector modulation and controls the distortion spectrum. Further, it is an object of the invention to provide a corresponding system for performing such a method.

SUMMARY

The aforementioned object is achieved by providing a method for controlling a distortion spectrum produced by space vector modulation in the case of a switch-based inverter that modulates at least one output variable. Different switch positions causing a modulation of the at least one output variable, which approximately follows a prescribed reference signal, are ascertained for each chronologically subsequent switching process. Further, a respective distortion spectrum that would be produced from a respective implementation of these different switch positions is calculated from disparities between the reference signal and the at least one output variable, and that switch position for which the associated distortion spectrum is most suitable in accordance with predetermined or prescribed properties, i.e. best implements the predetermined or prescribed properties is selected and is implemented in the inverter.

In one embodiment of the method, a respective phase of an AC current and/or of an AC voltage corresponds to an output variable of the inverter.

In order to keep the switching losses of the inverter within limits, it is possible, in one embodiment of the method according to the invention, for at least one of the predetermined properties chosen for selecting the most suitable switch position to be a mean switching rate.

In a further embodiment, at least one of the predetermined properties chosen is that distortion spectrum associated with the switch position to be selected that has a spectral gap in a prescribed range. This is particularly significant in the event of simultaneous adjacent use of systems that dynamically change their sensitive spectral range, such as e.g. car radios performing a station sweep. A spectral gap accompanying the station sweep in the car radio in parallel in the designed distortion spectrum is conceivable in this case. In the same way, norms applicable at a location of the electric vehicle (for example ISO, national standards, CISPR limit values) can lead to stipulations of spectral gaps in the distortion spectrum, which sometimes results in the predetermined properties needing to be reselected in the event of national borders being crossed, as may occur during operation of the electric vehicle. The respective location of the electric vehicle can be made available from the onboard electronics by means of GPS information in this case.

The stipulation of properties according to which the most suitable distortion spectrum, in accordance with the properties, is obtained where the method according to the invention is carried out is a central advantage of the invention, since it avoids a method of system clock variation known from the prior art to date that influences other vehicle systems and complicates control.

The method may be implemented by a modulator that modulates the output variable of the inverter. The task of the modulator is to match a gradually quantized output variable of the inverter approximately to the continuous, at least partially sinusoidal reference signal and in so doing to pay heed to predetermined properties of the distortion spectrum. Both are achieved by means of numerical handling of the distortion spectrum. In an extension of the method according to the invention, at least one switching signal of the inverter is produced directly by the modulator.

In accordance with the method, a predetermined number m of vectors that are in the nearest neighbourhood to a vector of the reference signal that needs to be located within a space vector diagram of the space vector modulation is ascertained within the space vector diagram of the space vector modulation. By way of example, in the case of what is known as a three-phase two-level inverter, there are always m=3 vectors in the nearest neighborhood to the vector to be assigned to the reference signal (see FIG. 2).

In a development of the method, a zero vector that is in the nearest neighborhood is chosen such that a change of switch position that is necessary for setting said zero vector results in a switching loss being minimized. Generally, there are multiple equivalent implementations of the zero vector, in particular in bridge circuits. By way of example, in the case of a two-level inverter (see FIG. 2), the zero vector can be produced either by closing all "low-side switches" or alternatively by closing all "high-side switches". To minimize switching losses, that implementation for which the smallest number of switch changes from the preceding switch position is necessary would be chosen. Advantageously, the invention also involves that implementation of the zero vector for which a current that is necessary for changing the switch position is minimized being chosen.

Figure 3:
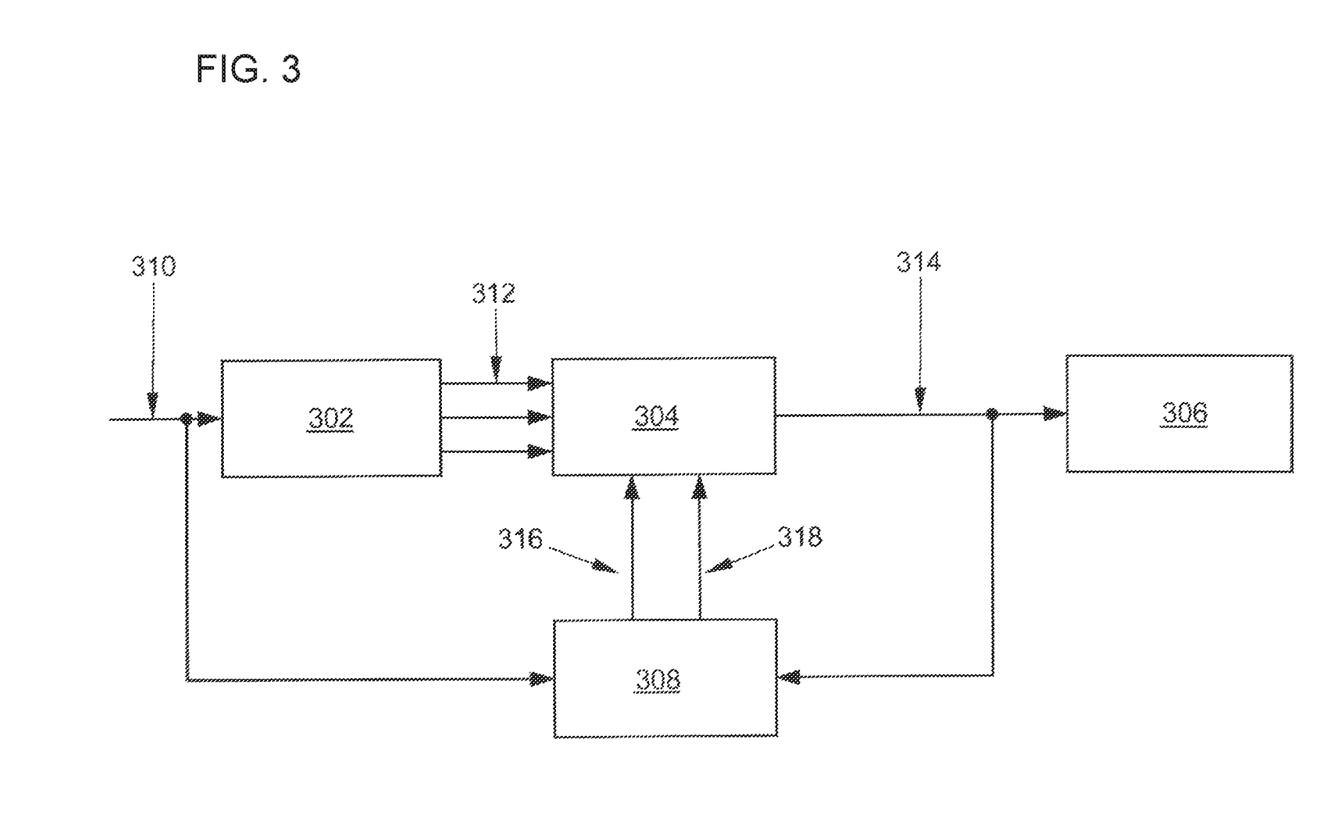
FIG. 3 is a schematic depiction of a possible embodiment of a modulator according to the invention.

In accordance with the invention, a respective difference from the vector of the reference signal is determined for each of the m ascertained vectors, a temporal profile of the differences is created from this respective difference and respective differences between vectors of the at least one output variable and vectors of the reference signal from a plurality of immediately preceding time steps, and said temporal profile is numerically compared with a temporal profile shaped in accordance with the predetermined properties (see FIG. 3).

In one variant of the method, differences longer ago in the past are given a weaker rating, specifically the further ago they are in the past, the weaker.

In one development of the method, the temporal profile of the differences of the at least one output variable is transformed into the frequency domain and forms what is known as the distortion spectrum therein, said distortion spectrum being used to perform the numerical comparison with a frequency spectrum shaped in accordance with the predetermined properties.

In a further development of the method, a filter, for example corresponding to the inverse of a predetermined distortion spectrum, is applied to the distortion spectrum obtained by means of the transformation into the frequency domain. If there is a spectral gap in the predetermined distortion spectrum, for example, this range remains unaltered by the application of the filter having the inverse of the predetermined distortion spectrum in the distortion spectrum obtained from the above transformation, whereas other spectral ranges are decreased, for example.

In accordance with the invention, a norm formed by means of the distortion spectrum obtained from the transformation is attributed to a quality index by means of which the most suitable distortion spectrum with the associated switch position, which corresponds to a smallest numerical value of the quality index, for example, is selected and transferred to the inverter.

In one development of the method according to the invention, the norm formed is a p-norm, for example with p=2 the square root of the sum of the squared differences. When a 2-norm is used (which corresponds to a power), the value is identical for most frequency transformations in accordance with the Plancherel theorem on account of an energy equality of the time and frequency domains.

In accordance with the invention, an overall quality index is obtained from the summation of the respective quality indices of an output variable, for example again by formation of a p-norm. This is again used to select a most suitable switch position.

In a further development of the method, a difference formation between the ascertained vectors and the vector of the reference signal takes place exclusively in the phase space. Since conversions to a time domain are always associated with additional computational complexity and any numerical operations lead to rounding error propagation on account of a finite computation accuracy, it is advantageous to limit oneself to a single phase space representation by amplitude and phase for all outputs of a three-phase system, for example three phase outputs in the case of a three-phase drive motor. This also minimizes a storage requirement for storing the temporal profile of vectors obtained beforehand by carrying out the method according to the invention.

As above, in this embodiment too, each candidate i=1, ..., m to be tested consists of the previous temporal switching profile and one or more future steps, but with the respective candidate now being described purely in a two-dimensional vector representation $v_{K,i}(t)=(A(t), \varphi(t))^T$, with amplitude $A(t)$ and phase $\varphi(t)$ of a single space vector, connected in quantized fashion to the points of a space vector diagram, at the time t. Instead of converting the disparity from a prescribed reference signal into a voltage or current profile at one or more phase outputs for at least one candidate and then ascertaining the distortion spectrum, the distortion spectrum is estimated directly in the phase space. First, a two-dimensional vectoral disparity between the candidate vector $v_{K,i}$ and the reference vector $v_{ref}$ representing the reference signal is formed at a $\varphi(t)=\omega_0 t$ time $t+t_{predict}$. This takes place over a certain window with n times in the recent past, in which all candidates are equal, or are consistent with a previous switching profile, or, in the case of predictive methods, a certain time into the future, in which the candidates differ. The reference signal normally corresponds to a continuous vector $v_{ref}(t)=a_0\, e_r+\varphi(t)e_\varphi$ in angle coordinates, or $v_{ref}(t)=a_0\cos(\varphi(t))e_x+a_0\sin(\varphi(t))e_x$ in cartesian coordinates, and models for example a sinusoidal profile of phase voltages or phase currents at a specific frequency $\omega_0$, from which the phase is obtained. The calculation of the disparity $$\{[\vec{v}_{K,i}(t+t_{predict}-\tau)-\vec{v}_{ref}(t+t_{predict}-\tau)]\cdot \vec{e}_x\}^2+\{[\vec{v}_{K,i}(t+t_{predict}-\tau)-\vec{v}_{ref}(t+t_{predict}-\tau)]\cdot \vec{e}_y\}^2, \quad (1)$$

is performed over all two dimensions of the phase space and for all times $\tau$, and mapped onto one scalar function each over the time characteristic, preferably by a vector norm:

$$\|\vec{v}_{K,i}(t+t_{predict}-\tau)-\vec{v}_{ref}(t+t_{predict}-\tau)\|. \quad (2)$$

If the norm is a two-norm, and therefore a Euclidian norm, the result, as already mentioned above, is consistent with a power addition, which is also maintained according to a Fourier transformation on the basis of the Plancherel theorem.

From the scalar function (2) for the disparity of each candidate from the reference for a certain time characteristic, the method according to the invention, as described above, calculates the respective associated distortion spectrum in the frequency domain by means of a Fourier transformation (FT), which may be implemented numerically as a fast Fourier transformation. However, in this configuration of the method according to the invention, regardless of the number of output phases of the inverter, only one Fourier transformation is ever carried out, which minimizes the computational complexity, which is advantageous specifically on a generally customary implementation of the method on an FPGA IC.

Furthermore, the respective spectrum can again be weighted with a prescribed filter that ultimately boosts the spectral profile of the arising distortion to different levels in accordance with the desired stipulations or emphasizes it for the subsequent rating by means of a quality index. If for example the candidate $v_{K,i}$ having the smallest disparity is sought by stipulating a filter $F(\omega)$, then $$\arg\min_i \|F(\omega)FT\|\vec{v}_{K,i}(t+t_{predict}-\tau)-\vec{v}_{ref}(t+t_{predict}-\tau)\|\|_p \quad (3)$$

needs to be calculated, wherein, as mentioned above, a p-norm was formed over the entire weighted distortion spectrum. In this case, a choice of a large p-value primarily involves a peak that stands out from the weighted distortion spectrum to the greatest extent at each time being included in the further rating, that is to say being rejected in accordance with equation (3). A low p-value minimizes all components of the weighted distortion spectrum more uniformly. A choice of p=2 approximately optimizes the power of the weighted distortion spectrum over all frequencies.

Further, prior to a normalization when a complex Fourier transformation is used, an absolute value can be applied in order to reduce complex or negative numbers to the magnitude thereof.

The candidate having the lowest scalar value from equation (3) produces a distortion spectrum that is closest to the prescribed distortion spectrum of the filter in accordance with the method according to the invention. Accordingly, that candidate is converted into the switch signals for the semiconductors and adopted as the state for a next switch cycle or the next switch cycles in the inverter.

In an alternative to this development of the method, the disparities of the candidate vector from the reference signal or from the reference vector from equation (1) prior to the Fourier transformation are integrated over a time window, consisting of a portion in the past of duration w up to the time $t+t_{predict}$:

$$\int_0^{w\,large} d\tau(\{[\vec{v}_{K,i}(t+t_{predict}-\tau)-\vec{v}_{ref}(t+t_{predict}-\tau)]\cdot \vec{e}_x\}^2+\{[\vec{v}_{K,i}(t+t_{predict}-\tau)-\vec{v}_{ref}(t+t_{predict}-\tau)]\cdot \vec{e}_y\}^2). \quad (4)$$

With the aforementioned Fourier transformation (FT), the weighting with a frequency-dependent filter $F(\omega)$ and a p-norm over all weighted frequency components, the computation code obtained for determining the quality index for a candidate vector $v_{K,i}$ is:

$$\arg\min_i \quad (5)$$

$$\left\| F(\omega) FT \left\| \int_0^{w\,large} d\tau \|\vec{v}_{K,i}(t+t_{predict}-\tau)-\vec{v}_{ref}(t+t_{predict}-\tau)\| \right\| \right\|_p .$$

The integration leads to low-pass filtering of the distortion, however, which should be compensated for in the filter by virtue of the filter having a characteristic approximately proportional to the inverse of the frequency.

In a further development of this alternative of the method, in order that the filter $F(\omega)$ can continue to correspond to the desired frequency profile of the distortion spectrum, the time integral in the Fourier transform is therefore weighted inversely to the frequency $\omega$:

$$\arg\min_i \quad (6)$$

$$\left\| \frac{F(\omega)}{\alpha+\omega} FT \left\| \int_0^{w\,large} d\tau \|\vec{v}_{K,i}(t+t_{predict}-\tau)-\vec{v}_{ref}(t+t_{predict}-\tau)\| \right\| \right\|_p .$$

The constant a prevents the divergence of the DC components and permits an adjustment of the accuracy with which the reference signal (voltage or current stipulation) is represented.

Although the method has repeatedly been described in this application using the example of a two-level three-phase inverter, it is generally not restricted thereto and can be used for any multilevel inverter. In particular, ascertainment of vectors in the space vector diagram of the respective multilevel inverter is possible for any number of levels.

Further, a system is claimed that comprises an inverter, a current and/or voltage source and a modulator controlling the inverter, the system being designed to carry out the method according to the invention.

In one embodiment of the system, the modulator has at least the following modules: a nearest-neighbor module designed to ascertain within a space vector diagram of a space vector modulation a predetermined number of vectors that are in the nearest neighborhood to a reference vector of a reference signal that needs to be located within the space vector diagram of the space vector modulation: a history module designed to form a history of reference vectors and of a vector of the at least one output variable from each time step of a number of preceding time steps; and a selection module designed to use the nearest-neighbor module and the history module to select the most suitable vector, in accordance with predetermined properties, of the at least one output variable.

In a further embodiment of the system, the selection module has a separate pipeline for each of the ascertained vectors, wherein the selection module is designed to execute a plurality of pipelines in parallel.

Further, a modulator is claimed that is designed to use a reference signal as input variable to control switches of an inverter, and in so doing to carry out the method according to the invention, wherein the modulator has at least the following modules: a nearest-neighbor module designed to ascertain within a space vector diagram of a space vector modulation a predetermined number of vectors that are in the nearest neighborhood to a reference vector of a reference signal that needs to be located within the space vector diagram of the space vector modulation: a history module designed to form a history of reference vectors and of a vector of the at least one output variable from each time step of a number of preceding time steps; and a selection module designed to use the nearest-neighbor module and the history module to select the most suitable vector, in accordance with predetermined properties, of the at least one output variable.

Finally, a modulator is claimed that controls an inverter whose power electronics use a semiconductor having a wide band gap. By way of example, the method according to the invention is able to be carried out by a modulator for controlling an inverter that is operated using a gallium nitride semiconductor, and has voltages in the region of 100 V, currents in the region of 30 A and switching rates in the region of 500 kHz.

Further advantages and developments of the invention are obtained from the description and the accompanying drawings.

It goes without saying that the features cited above and those yet to be explained below are usable not only in the respectively indicated combination but also in other combinations or on their own without departing from the scope of the present invention.

DETAILED DESCRIPTION

Figure 1:
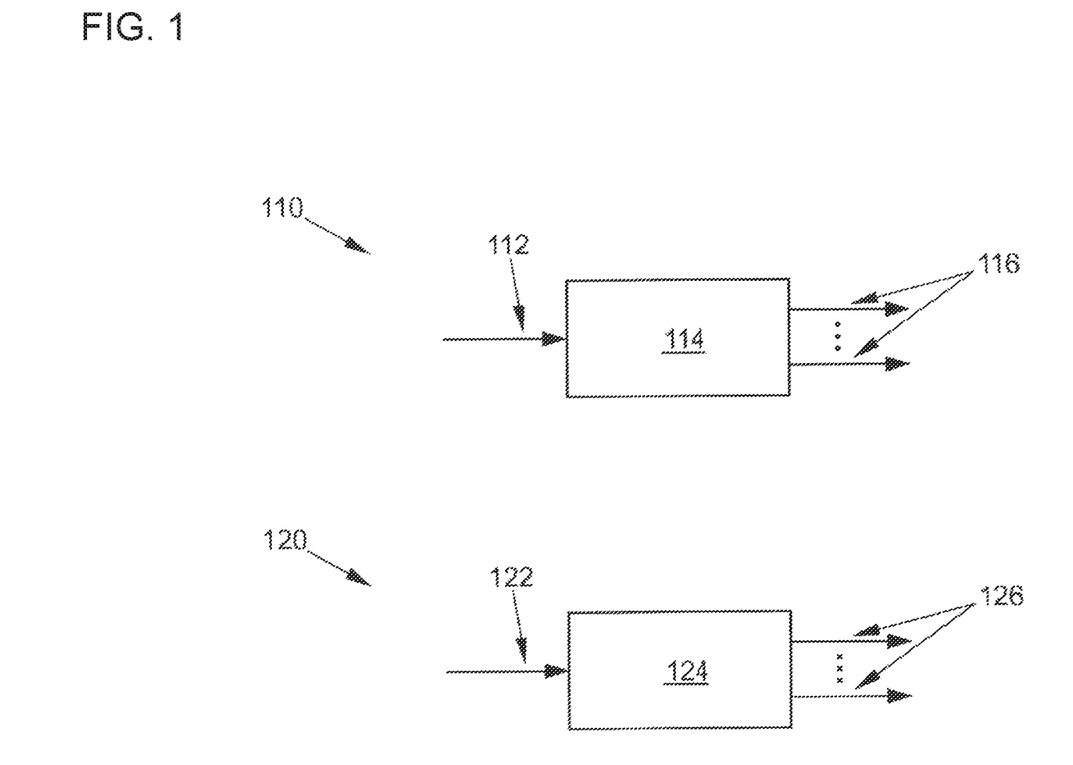
FIG. 1 is a schematic depiction of two possible tasks of a modulator controlling an inverter.

FIG. 1 uses a schematic depiction to illustrate two possible tasks of a modulator 114 and 124 controlling an inverter. First, drawing 110 depicts a modulator 114 that obtains an at least partially sinusoidal reference signal as an input signal 112, matches said reference signal to a plurality of quantized output options of the inverter by means of a space vector modulation, and the output signals 116 of said inverter consist of respectively quantized switching signals for a plurality of phases for controlling the inverter. Secondly, drawing 120 depicts an extended modulator 124 that receives an at least partially sinusoidal reference signal as an input signal 122, matches said reference signal to a plurality of quantized output options of the inverter by means of a space vector modulation, and the output signals 126 of said inverter consist of direct switching symbols for controlling the inverter.

Figure 2:
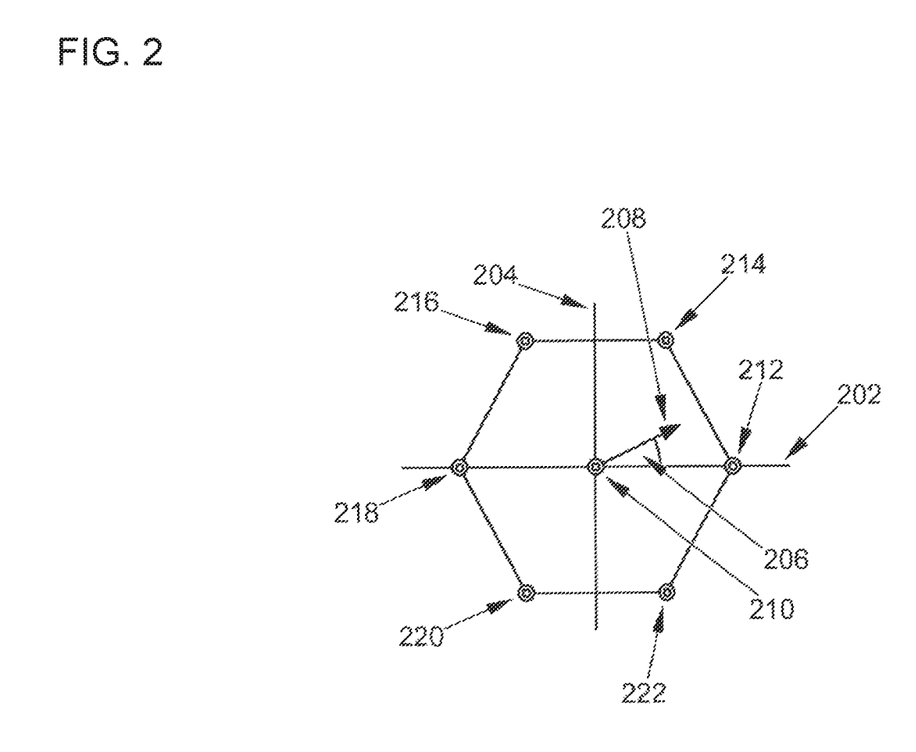
FIG. 2 is a space vector diagram for the selection of nearest neighbors for a vector.

For the example of a two-level inverter, FIG. 2 shows a space vector diagram for the selection, according to the invention, of three vectors 210, 212, 214 of the space vector modulation that, by way of example, are in the nearest neighborhood to a possible vector 208 of the reference signal. The axis 202 forms the angle 0 or 2 pi to the right and the angle pi to the left. The axis 204 forms the angle pi/2 upward and the angle 3 pi/2 downward. The vector 208 of the reference signal has an amplitude A and a phase angle φ with the reference sign 206. A respective vector 210, 212, 214, 216, 218, 220, 222 of the space vector modulation results in switch positions that can be produced directly by the inverter. A special position is occupied by what is known as the zero vector 210, for which all switches in the inverter are either open or closed. Further switch positions for the vectors 212, 214, 216, 218, 220, 222 are obtained from the prior art. For a vector 208 of the reference signal, a number m of nearest vectors in the space vector diagram is ascertained according to the invention in each time step, said number consisting of m=3 vectors, which comprise the zero vector 210 and two respective corners of the hexagon, for the example of a two-level inverter in the hexagon shown. For a phase angle 206 of the reference signal of greater than 0 and less than or equal to pi/3, said zero vector and corners are 210, 212, 214, between greater than pi/3 and less than or equal to 2 pi/3 they are 210, 214, 216, between greater than 2 pi/3 and less than or equal to pi they are 210, 216, 218, between greater than pi and less than or equal to 4 pi/3 they are 210, 218, 220, between greater than 4 pi/3 and less than or equal to 5 pi/3 they are 210, 220, 222, and between greater than 5 pi/3 and less than or equal to 2 pi, which is also consistent with an angle of 0, they are 210, 222, 212.

FIG. 3 shows a schematic depiction of a possible embodiment of a modulator according to the invention. A latest vector $v_{ref}=(A(t), \varphi(t))^T$ of the reference signal 310, consisting of amplitude $A(t)$ and phase angle $\varphi(t)$, for a time step t forms an input signal for a nearest-neighbor module 302 that can ascertain within a space vector diagram of a space vector modulation a predetermined number m of vectors, m being greater than or equal to 1, that are the nearest neighborhood to a reference vector of a reference signal that needs to be located within the space vector diagram of the space vector modulation. The ascertained m vectors 312 are forwarded to a selection module 304. Additionally, the latest vector $v_{ref}(t)=(A(t), \varphi(t))^T$ of the reference symbol 310 is supplied to a history module 308, which stores it. Additionally, the history module 308 has the values of the vector of the reference signal $\{v_{ref}(t-i)\}_{i=1,\ldots,n}$ available in stored form for n time steps, n being greater than or equal to 1, in each case prior to the latest time step. Moreover, the history module 310 also keeps the values for a vector of the output variable $\{v_{out}(t-i)\}_{i=1,\ldots,n}$ that is chosen for n time steps in each case prior to the latest time step. Both series of values are available to the selection module 304 as a chronological history 316 of the chosen output variable $\{v_{out}(t-i)\}_{i=1,\ldots,n}$ and a chronological history 318 of the vector of the reference signal together with the latest value $\{v_{ref}(t-i)\}_{i=0\ldots n}$. The selection module 304 then carries out the method according to the invention to select the most suitable vector $v_{out}(t)$ for the latest output variable 314 and forwards said vector, or the switch position connected thereto, to a piece of hardware 306, in particular an inverter. Additionally, the selected vector $v_{out}(t)$ is stored for the latest output variable 314 in the history module 308.

Figure 4:
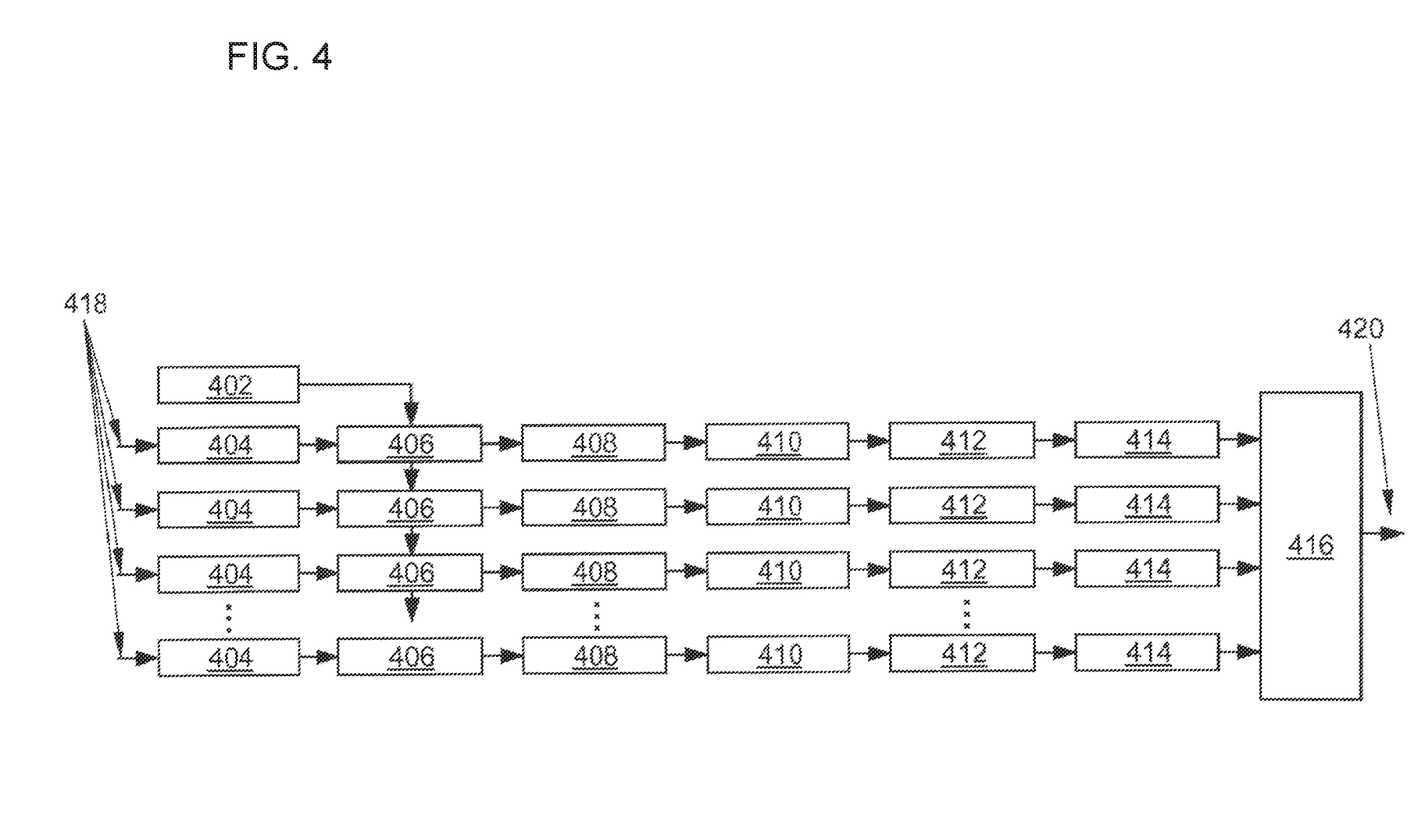
FIG. 4 is a schematic depiction of a possible embodiment of a module of a modulator, provided in accordance with the invention, for selecting a suitable vector of an output signal.

FIG. 4 shows a schematic depiction of a possible embodiment of a module of a modulator, provided in accordance with the invention, for selecting a suitable vector of an output signal. The m input vectors 418 originate from the nearest-neighbor module 308 from FIG. 3 and consists of the m ascertained vectors that are in the nearest neighborhood to a reference vector of a reference signal that needs to be located within the space vector diagram of the space vector modulation. For each of these m input vectors 418, there is advantageously a pipeline 404, 406, 408, 410, 412, 414, which are executed in parallel. In a respective module 404, there is a value, assignable to the respective input vector, of a phase voltage that represents one of the three phases in the example of a three-phase two-level inverter. Advantageously, the other two phases are also executed in the same pipeline. Module 402 receives from the history module 308 in FIG. 3 the n past values for the vector of the reference signal together with the latest value, and the n past values for the vector of the output variable, converts both series of values into values for voltages and forwards these values to a difference module 406 for difference formation. Together with the respective latest voltage value from an output variable from the respective module 404, the respective difference between reference signal and proposed output variable is calculated for n+1 time steps and forwarded to a respective weighting module 408. In the weighting module 408, which can also optionally be omitted, the differences are weighted differently from one another. By way of example, it is conceivable for differences longer ago in the past to be provided with a weaker weighting than new, i.e. more recent, differences. It is also conceivable to form an integral over the differences multiplied by a filter and to weight said integral for example relative to a sum of switching losses arising in the inverter when the respective vector of the output variable is implemented. A frequency transformation, preferably a Fourier transformation, takes place in the frequency transformation module 410 in each case. A spectral filter, for example corresponding to an inverse of a desired distortion spectrum, is optionally applied to the respectively resulting frequency spectrum in a respective filter module 412. Finally, a mathematical norm, for example a p-norm is applied to the filtered result in a respective norm module 414, said norm delivering a single quality index as result. If more than one phase was expected, the norm formation also involves the, by way of example, three phases being combined by a second p-norm to form an overall quality index. All (overall) quality indices are available in a subsequent rating module 416, and that original input vector 418 whose (overall) quality index has a lowest value is output 420 to the hardware, or the inverter. In an alternative embodiment, the spectral filter executed in the respective filter module 412 is used as convolution in the time domain, i.e. without frequency transformation in the frequency transformation module 410.

Figure 5:
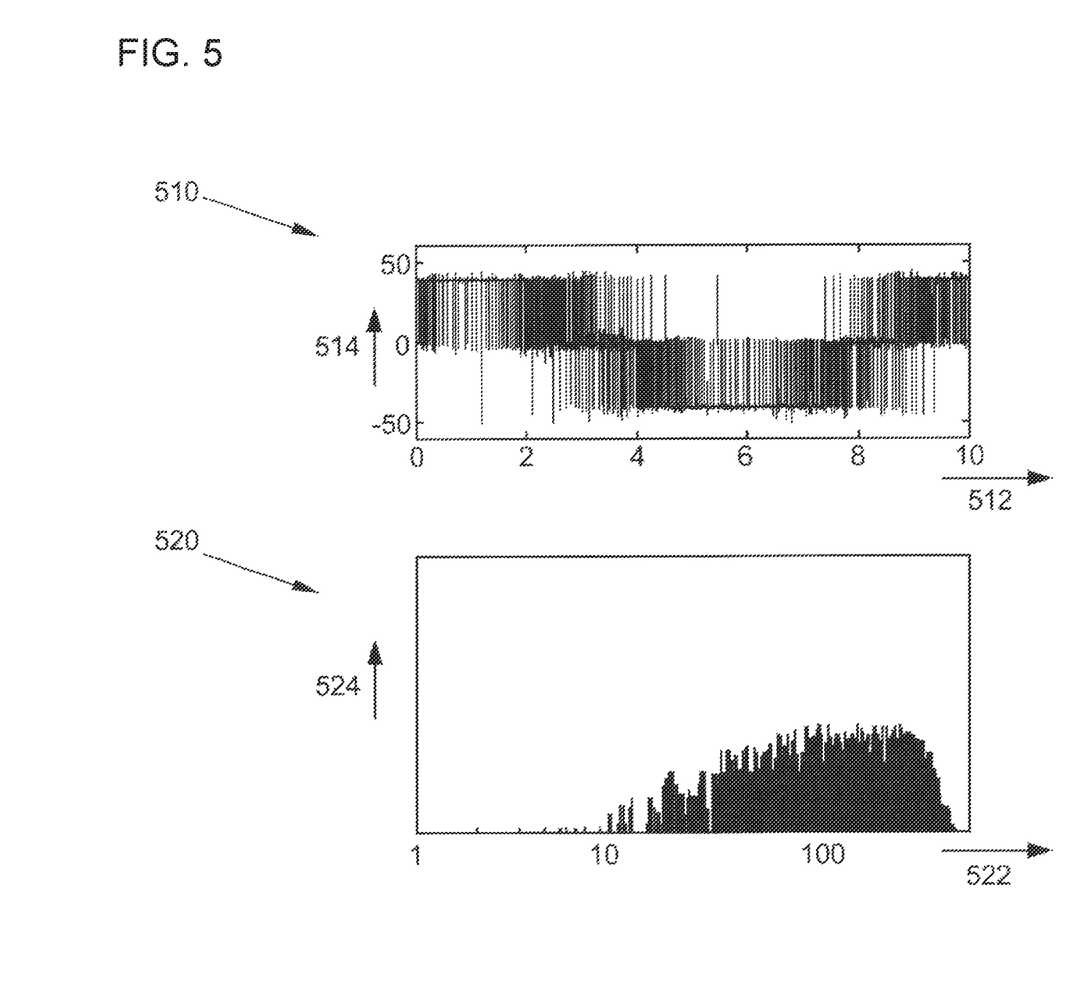
FIG. 5 is switching states and a respective associated distortion spectrum by way of example in accordance with an embodiment of the method according to the invention.

FIG. 5 shows switching states and an associated frequency spectrum in accordance with an embodiment of the method according to the invention by way of example. The output 510 from a three-phase inverter chosen by way of example is of largely identical appearance to conventional pulse-width-modulated inverters in a time domain 512. The voltage 514 is plotted in the upward direction in volts. However, in the spectral range 520, with power density 524 plotted in the upward direction and frequency 522 in kHz to the right, selective profiles can be enforced, for example an almost levelly clipped upper edge of the spectrum. E.g. the inverse of the distortion spectrum shown for the spectral range 520 is approximately consistent with a rectangle that comprises a range from approximately 10 kHz to 500 kHz in the frequency 522 and, in the power density 524, the highest peak of the spectrum.

Figure 6:
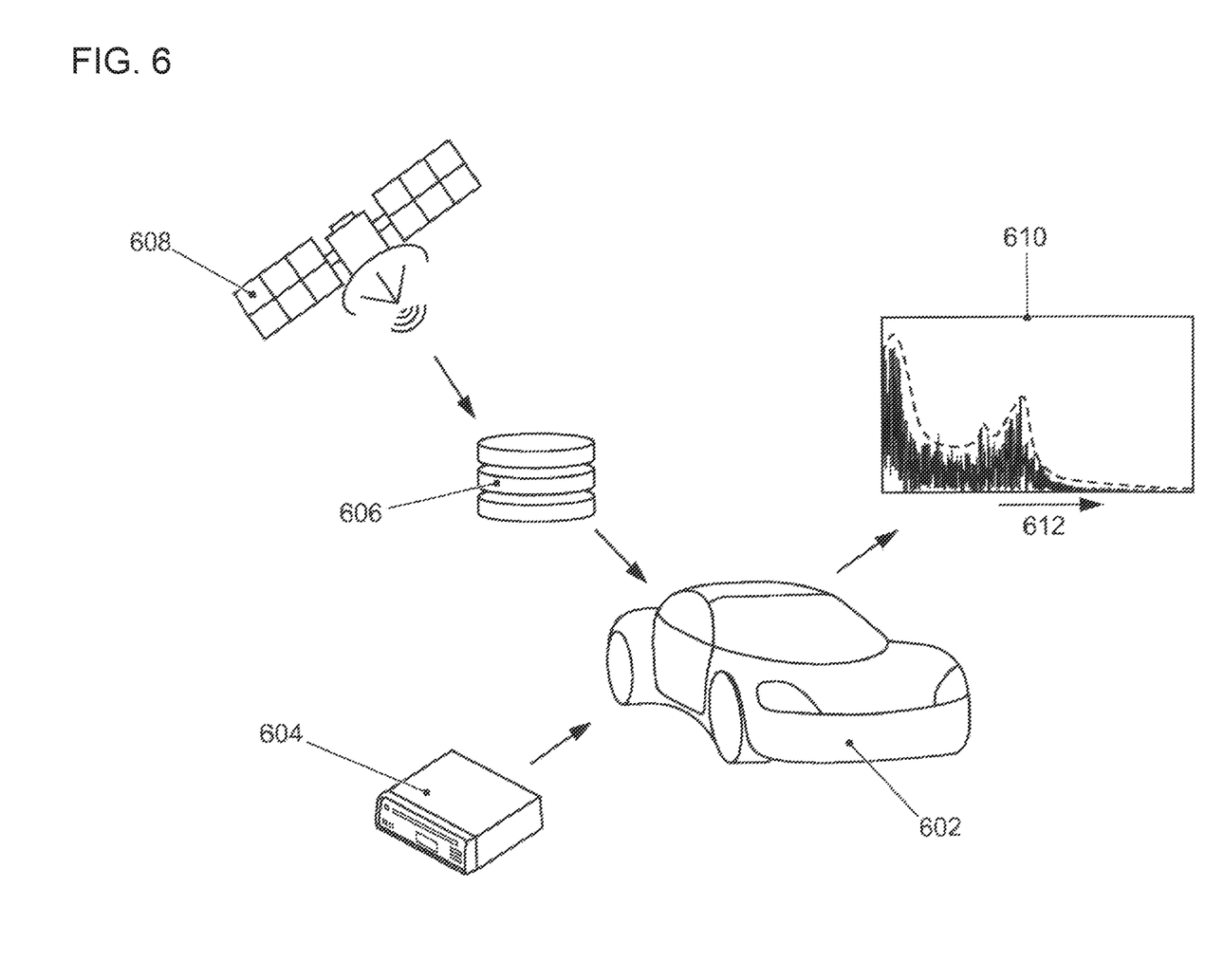
FIG. 6 is a schematic depiction of an environment in which an electric vehicle moves and that contributes to a predetermination of the properties of the distortion spectrum.

FIG. 6 shows a schematic depiction of an environment in which an electric vehicle 602 moves and that contributes to a predetermination of the properties of the distortion spectrum 610 plotted over the frequency 612. As such, for example a database 606 carried in the electric vehicle 602 provides demands, determined by means of location information obtained from a GPS system 608, on the properties of the distortion spectrum that result from the respective national standards. Electronic devices 604 present in the electric vehicle 602, such as e.g. radio tuners, GPS receivers, or all devices in which any pulse modulation method is carried out also make demands on the distortion spectrum 610 brought about by an inverter.

Figure 7:
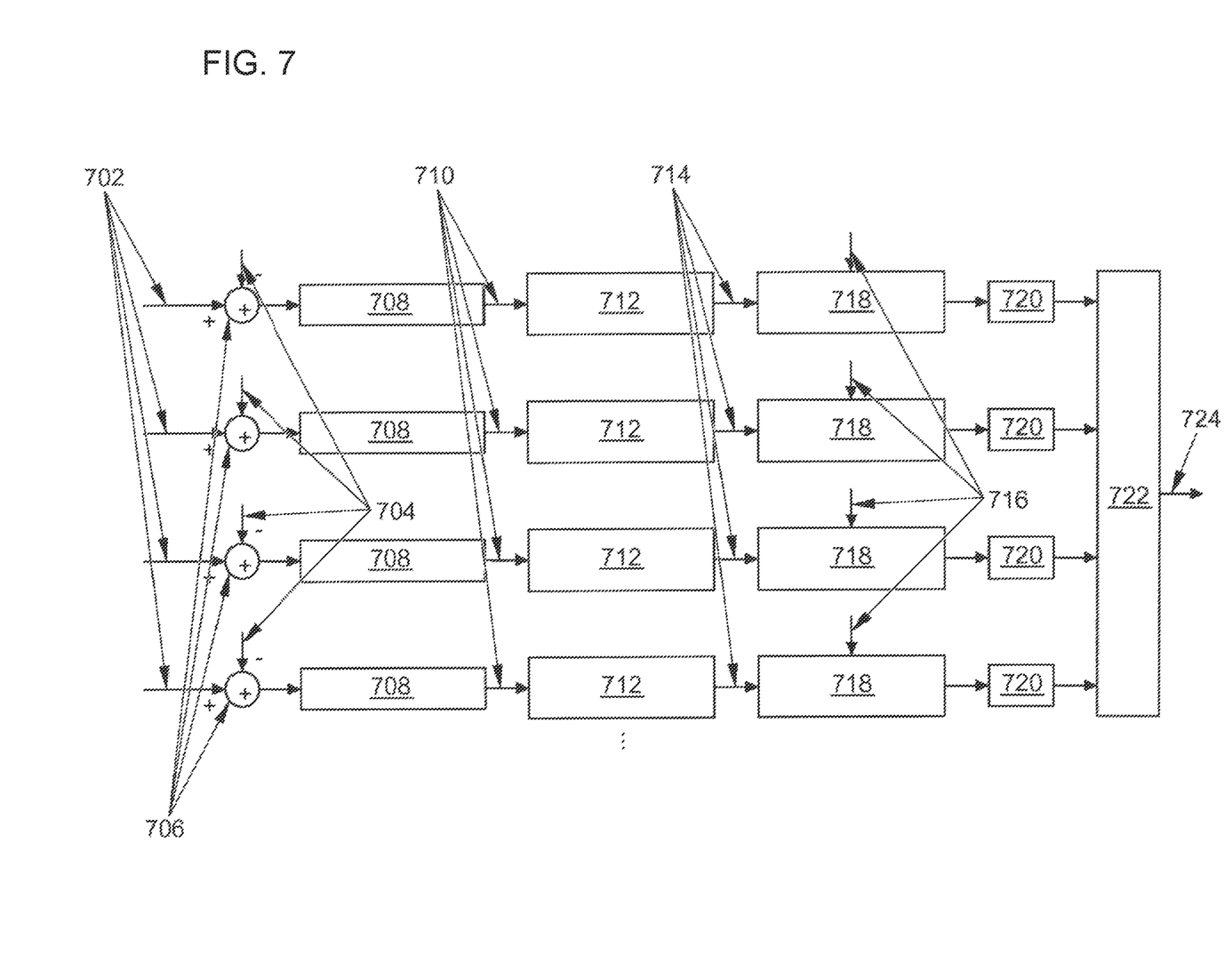
FIG. 7 is a schematic depiction of a further embodiment of a module of a modulator, provided in accordance with the invention, for selecting a suitable vector with difference formation with respect to the reference signal purely in the phase space.

FIG. 7 shows a schematic depiction of a further embodiment of a module of a modulator, provided in accordance with the invention, for selecting a suitable vector with difference formation in relation to the reference signal purely in the phase space. The m input vectors 702 originate from the nearest-neighbor module 302 from FIG. 3 and consist of the m ascertained candidate vectors $v_{K,i}$ that are in the nearest neighborhood to a reference vector of a reference signal that needs to be located within the space vector diagram of the space vector modulation. For each of these m input vectors 702, there advantageously exists a pipeline 706, 708, 710, 712, 714, 718 and 720, which are executed in parallel. In a respective module 706, the difference formation in relation to the reference signal 704 is formed purely in the phase space in accordance with equation (1) and is supplied to a respective module 708, which performs a scalar function, preferably a vector norm, for any time t from a range of the time characteristic in accordance with equation (2). The respective result 710 is supplied to a frequency transformation section 712 that calculates the respective associated spectrum 714 in the frequency domain and weights it with a prescribed filter 716 using module 718, and finally, after execution of a p-norm in module 720, supplies it to the determination of the quality index in accordance with equation (3) in module 722. The candidate having the lowest scalar value from equation (3) produces a distortion spectrum that is nearest to the prescribed distortion spectrum of the filter in accordance with the method according to the invention. Accordingly, that candidate is conveyed to the inverter as the nearest switch state 724.

Figure 8:
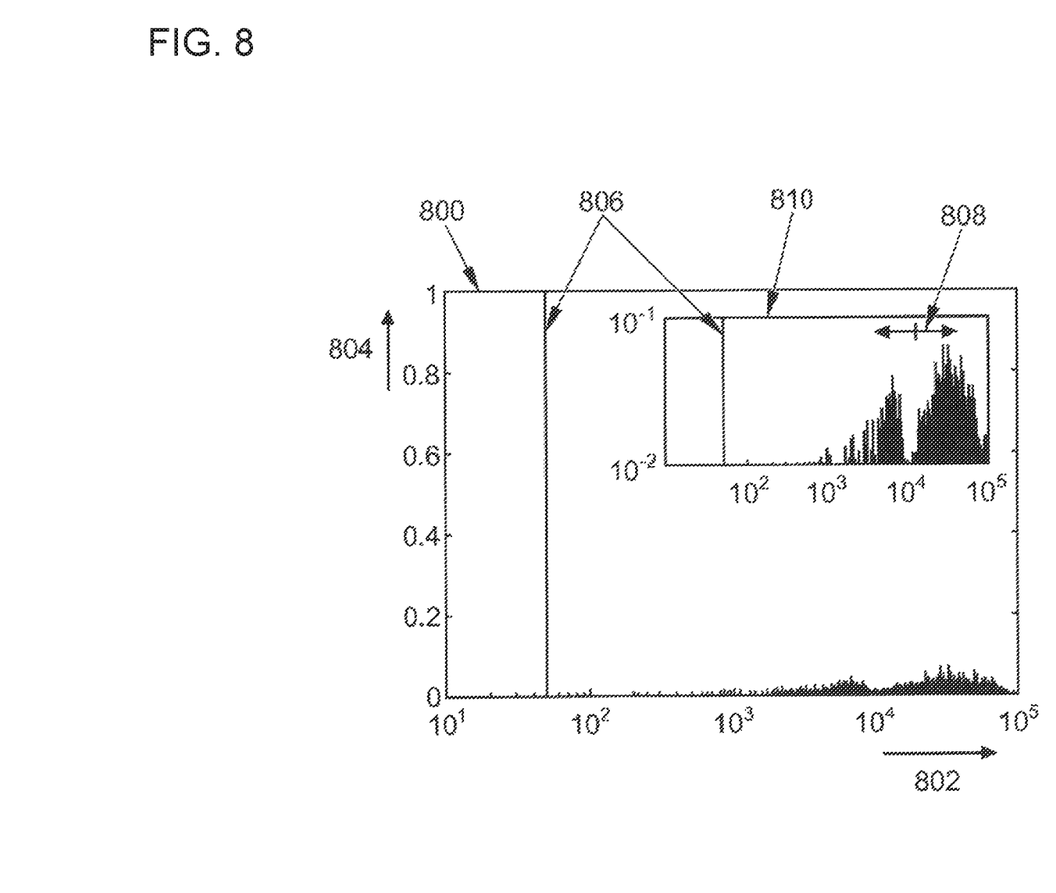
FIG. 8 shows a distortion spectrum in which the method according to the invention leads to a tunable spectral gap, by way of example.

FIG. 8 shows a distortion spectrum in which the method according to the invention leads to a tunable spectral gap 802, by way of example. In graph 800, the frequency 802 in hertz is plotted to the right and the power density 804 is plotted in the upward direction, as in the inset 810. The solid line 806 both in graph 800 and in the inset 810 indicates a spectral line at 50 Hz that needs to be avoided, for example, when the method according to the invention is used. In general, use of the method according to the invention allows spectral gaps to be produced in the distortion spectrum. Dynamic control of the spectrum furthermore allows the spectral gaps 808 to be adaptively altered, for example altered in width or tuned over a wide spectral range. Modern vehicles send the receiving frequency of the radio receiver to various controllers, for example. Accordingly, the power electronics can take such information as a basis for dynamically producing one or more spectral gaps 808 and dynamically accompany a station search, for example.

The invention claimed is:

1. A method for controlling a distortion spectrum (520, 610) produced by space vector modulation in the case of a switch-based inverter (306) that modulates at least one output variable, characterized in that different switch positions causing a modulation of the at least one output variable (510), which approximately follows a prescribed reference signal (112, 122, 208, 310), are ascertained for each chronologically subsequent switching process, a respective distortion spectrum (520, 610) that would be produced from a respective implementation of these different switch positions is calculated from disparities between the reference signal (112, 122, 208, 310) and the at least one output variable (510), and that switch position for which the associated distortion spectrum (520, 610) is most suitable in accordance with predetermined properties is selected and is implemented in the inverter (306).

2. The method of claim 1, wherein a plurality of output variables are chosen as a plurality of phases of an AC current and/or an AC voltage.

3. The method of claim 1, in which at least one of the predetermined properties chosen for selecting the respective switch positions is a mean switching rate.

4. The method of claim 1, in which at least one of the predetermined properties determined is that the distortion spectrum (510, 610) associated with the switch position to be selected has a spectral gap in a prescribed range.

5. The method claim 1, in which a modulator (114, 124) is used for modulating the at least one output variable of the inverter (306).

6. The method of claim 5, wherein the modulator (114, 124) produces at least one switching signal (126) for the inverter (306).

7. The method of claim 5, wherein the modulator (114, 124) ascertains within a space vector diagram of the space vector modulation a predetermined number of vectors (418) that are in the nearest neighborhood (210, 212, 214) to a vector (208) of the reference signal that needs to be located within the space vector diagram of the space vector modulation.

8. The method of claim 7, in which a zero vector (210) that is in the nearest neighborhood is chosen such that a change of switch position that is necessary for setting said zero vector results in a switching loss being minimized and/or in a current necessary for changing the switch position being minimized.

9. The method of claim 7, wherein a respective difference from the vector of the reference signal (112, 122, 208, 310) is determined for the ascertained vectors (418), and a temporal profile (304, 406) of the differences is created from this respective difference and respective differences between vectors of the at least one output variable (510) and vectors of the reference signal (112, 122, 208, 310) from a plurality of immediately preceding time steps.

10. The method of claim 9, wherein a difference formation (706) between the ascertained vectors (702) and the vector of the reference signal (704) takes place exclusively in the phase space.

11. The method of claim 9, wherein the temporal profile of the differences for the at least one output variable (510) is transformed into the frequency domain to form a distortion spectrum (520, 610).

12. The method of claim 11, wherein a filter is applied to the spectrum obtained by means of the transformation into the frequency domain.

13. The method of claim 1, wherein a norm formed by means of the distortion spectrum (520, 610) of the at least one output variable (510) is attributed to a quality index by means of which the most suitable distortion spectrum (520, 610) and hence the associated switch position are selected.

14. The method of claim 13, wherein an overall quality index is obtained for a plurality of output variables from the summation of the respective quality indices of the respective correspondingly multiple output variables and is used to select a most suitable switch position.

15. The method of claim 1, wherein the inverter (306) is a multilevel inverter.

16. A system comprising an inverter (306), a current and/or voltage source and a modulator controlling the inverter (306), wherein the system is designed to carry out the method of claim 1.

17. The system of claim 16, wherein the modulator (114, 124) has at least the following modules: a nearest-neighbor module (302) designed to ascertain within a space vector diagram of a space vector modulation a predetermined number of vectors (312) that are in the nearest neighborhood to a reference vector (208) of a reference signal that needs to be located within the space vector diagram of the space vector modulation: a history module (308) designed to form a history of reference vectors and of a vector of the at least one output variable from each time step of a number of preceding time steps; and a selection module (204) designed to use the nearest-neighbor module (302) and the history module (308) to select the most suitable vector of the at least one output variable.

18. The system of claim 17, wherein the selection module (304) has a separate pipeline (404, 406, 408, 410, 412, 414) for each of the ascertained vectors and is designed to execute a plurality of pipelines (404, 406, 408, 410, 412, 414) in parallel.

19. A modulator (114, 124) designed to use a reference signal (112, 122, 208, 310) as input variable to control switches of an inverter (306), and in so doing to carry out the method of claim 1, wherein the modulator (114, 124) has at least the following modules: a nearest-neighbor module (302) designed to ascertain within a space vector diagram of a space vector modulation a predetermined number of vectors (312) that are in the nearest neighborhood to a reference vector (208) of a reference signal (310) that needs to be located within the space vector diagram of the space vector modulation: a history module (308) designed to form a history of reference vectors and of a vector of the at least one output variable from each time step of a number of preceding time steps; and a selection module (204) designed to use the nearest-neighbor module (302) and the history module (308) to select the most suitable vector of the at least one output variable.

20. The modulator (114, 124) of claim 19, that controls an inverter (306) whose power electronics use a semiconductor having a wide band gap.

\* \* \* \* \*